United States Patent
Felbaum et al.

[19]

[11] Patent Number: 6,089,399
[45] Date of Patent: Jul. 18, 2000

[54] INERT-METAL LINED, SEAMLESS STEEL-BODY CYLINDER

[75] Inventors: John Wayne Felbaum, Greensburg; David William Treadwell, Belle Vernon; Joseph Tassone, White Oak, all of Pa.

[73] Assignee: Chatwins Group, Inc., Pittsburgh, Pa.

[21] Appl. No.: 08/956,605

[22] Filed: Oct. 23, 1997

Related U.S. Application Data

[62] Division of application No. 08/782,974, Jan. 14, 1997.

[51] Int. Cl.[7] .................................................. B65D 25/14
[52] U.S. Cl. .......................................... 220/582; 220/586
[58] Field of Search .................................. 220/582, 586, 220/587, 588–591

[56] References Cited

U.S. PATENT DOCUMENTS

| | | | |
|---|---|---|---|
| 3,447,712 | 6/1969 | Galasso et al. | 220/582 |
| 3,459,369 | 8/1969 | Marks | 220/582 |
| 3,635,370 | 1/1972 | Romanauskas | 220/582 |
| 3,917,115 | 11/1975 | Travers et al. | 220/586 |
| 4,006,838 | 2/1977 | Baumann et al. | 220/586 |
| 4,793,491 | 12/1988 | Wolf et al. | 220/586 |
| 5,088,685 | 2/1992 | Salvucci Sr. | 220/586 |

*Primary Examiner*—Joseph M. Moy
*Attorney, Agent, or Firm*—Barry I. Friedman; Thomas Lizzi; Sweeney Metz Fox McGrann & Schermer, LLC

[57] ABSTRACT

A seamless steel-body cylinder, suitable for storing ultra-high purity gases, has an inert metal lining. The cylinder lining is preferably nickel and completely covers the interior surface of the steel cylinder body, preventing the stored gas from making any contact and reacting with the steel cylinder body. The surface of the inert metal lining is conditioned to be smooth, preferably to 15 $R_a$ or better. The cylinder body is preferably externally threaded to secure end closure devices to the cylinder body. A process for making the cylinder comprises the steps of cutting a seamless steel pipe to form a cylinder body, conditioning the surface of the cylinder body, optionally thermomechanically working the cylinder body ends to altered diameters, descaling the interior surface, electroplating an inert metal layer on the cylinder interior, heat treating, machining threads into the exterior surface at the cylinder ends, machining the inside diameters of the cylinder ends, conditioning the inert metal surface to smoothen it and sealing the cylinder ends with end closure devices which are secured by securing devices to the threads on the exterior of the cylinder body.

53 Claims, 5 Drawing Sheets

INERT-METAL LINED, SEAMLESS STEEL-BODY CYLINDER

This application is a division of application Ser. No. 08/782,974 filed Jan. 14, 1997 which application is now pending.

BACKGROUND OF THE INVENTION

1. Field of the Invention

The present invention relates to an inert-metal lined, seamless steel-body cylinder, and a method of its production. More specifically, the invention relates to an inert-metal lined, steel-body cylinder for the storage of ultra-pure gases wherein the lining is a layer of a relatively inert metal which completely masks the steel of the cylinder body from exposure to the stored gas.

2. Description of the Prior Art

Cylinders have been in use for many decades for the storage of gases for scientific, commercial, and industrial uses. The bodies of these gas storage cylinders are ordinarily constructed of steel so as to economically achieve the high strengths necessary to contain stored gases at pressures which are typically in the range of 2000–5000 psi. Gas storage cylinders come in a variety of sizes from about an inch in diameter and under a foot long to several feet in diameter and decades of feet long. The most common gas storage cylinders are those that are typically used for storing helium for filling balloons or for use with welding gases. Those gas cylinders are roughly a foot in diameter and about four to five feet high. They have a flattened bottom end and a necked top end with an end closure device and valve screwed into the threads inside the neck As advanced scientific and industrial processes have become ever more sophisticated, the specifications for materials, including gases, used in those processes have become more stringent. For example, in the ultra-high technology production processes for making computer chips where the transistor size is on the order of microns, the specifications on gas purity are extremely demanding. Unfortunately, experience has shown that gas purity may be degraded by contaminants associated with the interior surface of the steel body of the gas storage cylinder such as rust, iron oxide, and dirt. The gas purity also may be degraded by the reaction products resulting from chemical reactions occurring between the steel body of the gas storage cylinder and the stored gas.

The amount of gas degradation due to gas-steel contact may be reduced by the use of a relatively inert, corrosion resistant metal to coat the interior of the steel-body cylinder. One such relatively inert, corrosion resistant liner material is nickel. Various methods have been attempted for producing steel-body gas storage cylinders lined with nickel. One method is to coat nickel onto the inside steel surface of the cylinder body by the use of electroplating. Several problems are encountered, however, with this embodiment. Closing the end of the cylinder is problematic because the end closures are secured to the cylinder body by screw threads machined into the interior of the neck of the cylinder body. Generally, because of strength and coating imitations, the nickel coating does not extend into the threaded region. This results in some exposure of the gas to the steel body. In order for the nickel to extend into the threaded region, it would be necessary for either the threads to be machined into the nickel layer or for the nickel layer to be deposited over previously machined threads. Machining threads into the nickel layer requires the nickel layer to be very thick, increasing the cost and time of production. There are also concerns about the relatively soft nickel coating having sufficient strength to guarantee that the threads would secure the end closure under service pressures. Furthermore, the bond strength between the nickel layer and the steel body might be insufficient to secure the end closure under service pressures. Alternatively, coating over already machined threads would require the use of a very thin layer of nickel. It is, however, very difficult to control the thickness of the nickel coating so that it is thick enough to ensure coverage of all the steel but yet not be so thick as to interfere with the engagement of the threads of the end closure. Another problem encountered when the screw threads are located inside the neck is that there is always the danger of particulate contamination from the cylinder manufacturing process being caught within the threads. These contaminants pose the threat of later dislodging and being carried by the gas onto the sensitive scientific or industrial components with which the gas is being used. Such contamination causes quality problems and results in rejection losses. Another problem is that the surface of the electroplated liner metal itself might have irregularities and rough areas which also can trap contaminants which could later contaminate the gas stream.

Thus, what is lacking in the art is a steel-body cylinder for storing ultra-pure gas which is completely lined with a relatively inert material, such as nickel, so that no steel surface is exposed to the stored gas. Also lacking is such a cylinder for storing ultra-pure gas which contains neither internal screw threads nor surface irregularities in the inert material lining surface which could trap contaminant particulates that could at some time contaminate the gas stream.

SUMMARY OF THE INVENTION

A seamless steel-body gas storage cylinder is provided which is suitable for storing ultra-high purity gas. The cylinder has an electroplated lining of a metal which is relatively inert to the stored gas. This metal lining prevents the stored gas from coming into contact and reacting with the steel of the cylinder body. The metal lining has a smooth, worked surface which minimizes the possibility of the stored gas being contaminated by particles trapped within grooves, pores, rough areas, and other surface irregularities. Furthermore, the cylinder preferably lacks internal threads to reduce or remove a potential source of contamination to the gas by exposed steel and trapped particulates. The cylinder is preferably threaded on its external surface for securing an external end closure device to each end of the cylinder body.

A process by which the seamless steel-body gas storage cylinder is made is also provided. The process starts with the cutting of a piece of seamless steel pipe of a suitable diameter to a length to form the cylinder body. The steel must be of a grade, such as 4130X, which is suitable for a gas-storage cylinder body. The interior surface of the cylinder body is prepared by conditioning it by abrasive grinding, grit blasting, and tumbling abrasive media in the cylinder body to reduce the interior surface roughness. This conditioning optimally results in a smoother surface on the as-electroplated metal layer. If desired, the ends of the cylinder body may be thermomechanically worked to alter their diameters to sizes which will accommodate end closure devices of desired sizes. Such thermomechanical working may be accomplished, for instance, by heating the ends of the cylinder body to an appropriate temperature and then hot swaging or hot spinning the respective ends to form a neck of an appropriate diameter and length to accommodate the desired end closure devices. When a thermomechanical working step is included, the step of surface conditioning by abrasive media tumbling is postponed until after the thermomechanical working step has been completed. In such a case, the tumbling operation also acts to descale the interior of the cylinder, removing any adherent scale that may have formed on the interior during the thermomechanical working. Optionally, machining may be employed to adjust the inside diameter of the cylinder body near its ends so as to minimize the amount of secondary machining that later will be required to fit the end closure devices into the ends after the inert metal layer has been electroplated onto the interior surface of the cylinder body.

After the interior surface has been suitably conditioned, a layer of a relatively inert metal is preferably electroplated onto that surface using methods well known to those skilled in the art. A heat treating step may then be employed for the dual purpose of removing any hydrogen that may have diffused into the steel during the electroplating operation and to improve the strength and toughness of the steel.

It is also within the scope of the invention to perform, prior to the electroplating step, a heat treatment on the cylinder body necessary to bring the steel to the requisite strength and toughness levels. It may also be necessary to perform a second low temperature baking out heat treatment. This is preferably performed at a temperature of 385° F. for a time period of four hours, to remove diffused hydrogen from the steel. After all heat treating has been completed, the exterior surface of the cylinder body may be cleaned and conditioned by conventional means and inspected for structural defects.

At the conclusion of all heat treatments, threads for securing the end closure devices to the cylinder body are fashioned, for example by machining, into the exterior surface of the cylinder body near its ends. Machining is performed to bring the inner diameters of the ends of the cylinder body to the final size necessary to make sealed fits with the end closure devices. At this point, any necessary hydrotesting may be conducted on the cylinder.

Steam cleaning or other conventional methods may be used to clean the interior of the cylinder following the hydrotesting. Final conditioning of the exposed surface of the electroplated metal lining is then accomplished by tumbling abrasive media inside the cylinder body. Areas which were not polished to the desired level by the tumbling abrasive media may also be polished by alternative known means such as an abrasive flapper wheel. After surface conditioning of the cylinder has been completed, the interior is thoroughly cleaned, preferably by water rinsing. An end closure device having at least one sealing gland is then removably inserted into each end of the cylinder body. A gas-tight seal is formed by the sealing gland between the end closure device and one or both of the surface of the electroplated inert metal layer and the end face of the cylinder body. At least one of the end closure devices preferably includes a gas transfer means for conducting gas into and out of the interior region of the cylinder. Other devices such as flow control valves, safety relief valves, and transfer tubes may also be incorporated into one or both end closure devices. Each end closure device is preferably secured to the cylinder body by a closure nut which is threadably interconnected to the exterior of the cylinder body. Any moisture remaining inside the cylinder is preferably removed by conventional means such as purging with hot dry gas, vacuum degassing, baking or a combination of these methods. Painting of the exterior surface of the cylinder body may also be accomplished at this point.

Nickel has been found to be a suitable metal for forming the electroplated inert metal layer on the interior surface of the steel body of the cylinder. Nickel is less reactive with many gases than is steel and is well suited for electroplating. However, the selection of the metal to be used depends upon the reactivity of the gas for a particular application. Therefore, while nickel is contemplated as the best mode of practice of the invention, it is to be specifically understood that other metals which may be electroplated onto steel may be utilized for the electroplated metal layer. These metals include cadmium, cobalt, copper, lead, tin, silver, gold, platinum and alloys thereof.

These and other advantages and features of the present invention will be more fully understood upon reference to the presently preferred embodiments thereof and to the appended drawings.

DESCRIPTION OF THE PREFERRED EMBODIMENTS

Figure 1:
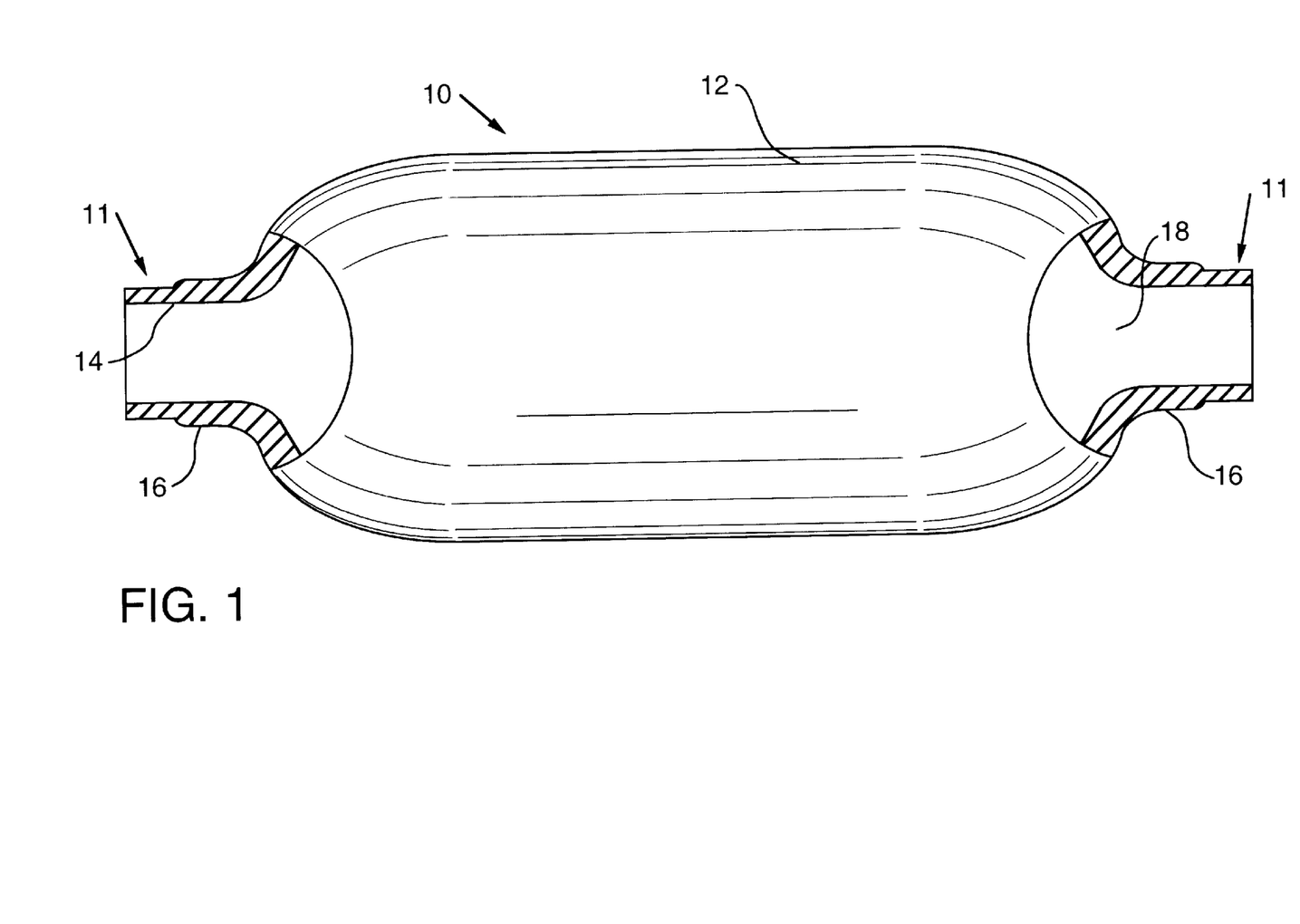
FIG. 1 is a side elevational view, partially in section, of the cylinder body.

Referring to the drawings, wherein like reference numerals designate like or corresponding parts throughout the several views, there is shown in FIG. 1 a partially cross sectional longitudinal view of a the cylinder body 10. The cylinder body 10 is constructed from seamless steel pipe. The cylinder body has an outer surface 12, an inner surface 14, and two ends 11. The cylinder body 10 also has an interior region 18 which, in service, is adapted to be filled with the stored gas. The cylinder body 10 may be of any size, depending on the desired size and wall strength requirements of the final gas storage cylinder. One exemplar embodiment utilizes a cylinder body of 24 inches in diameter and approximately seven feet long with a minimum wall thickness of 0.584 inches. The grade of steel may be any grade which one skilled in the art would recognize as being suitable for the construction of a cylinder for storing gas at the pressures the particular cylinder being constructed is to be subjected to in service. A list of some such grades of steel is given in Title 49 of the Code of Federal Regulations §§ 178.36 and 178.37 (1995 edition). In the preferred embodiment of the invention, the grade of steel used for the cylinder body 10 is 4130X.

Figures 2, 2A:
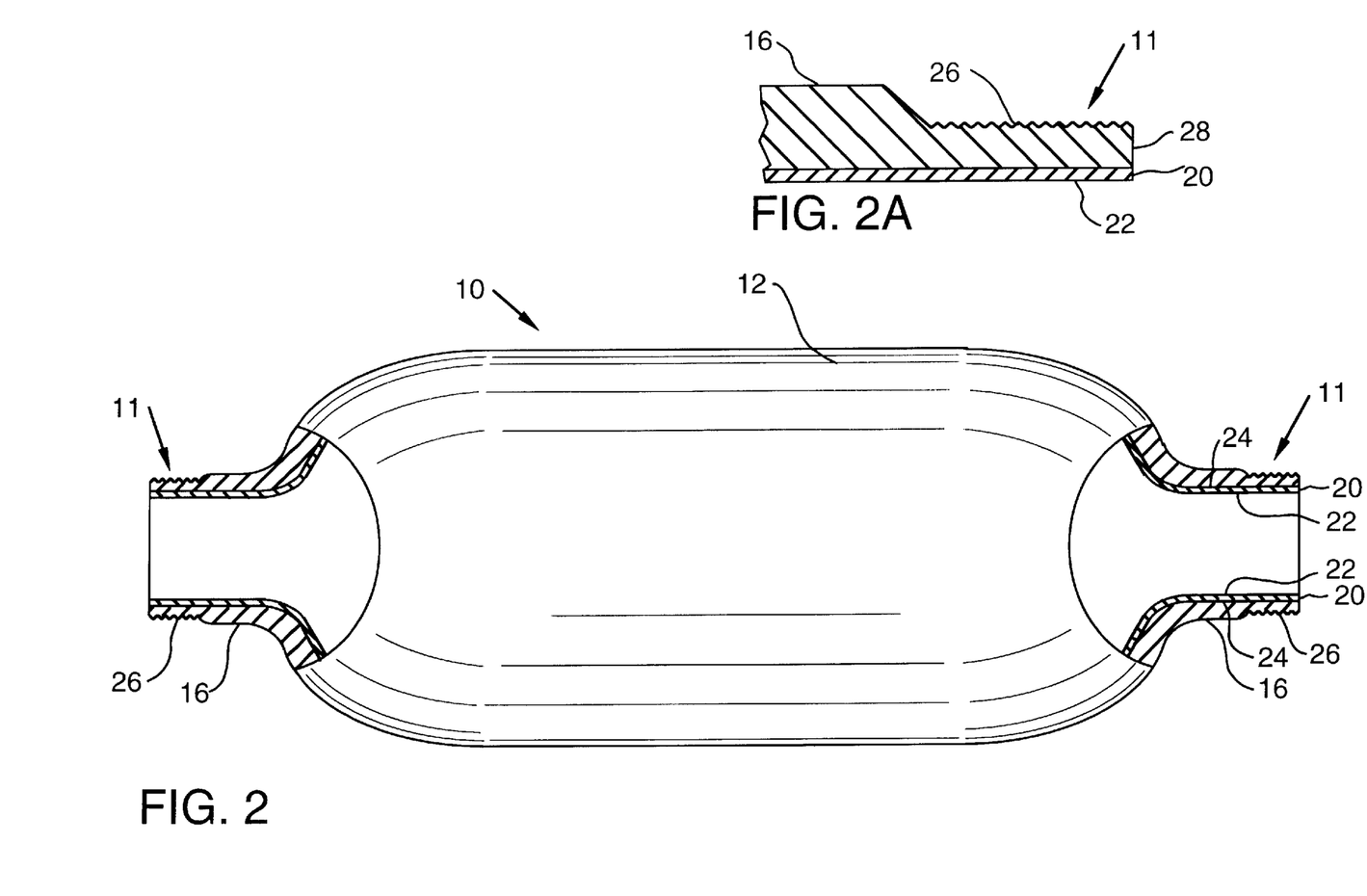
FIG. 2 is a side elevation view, partially in section, of the cylinder body shown in FIG. 1 having an applied inner surface and exterior threads applied thereto.
FIG. 2A is a longitudinal cross sectional view of a detail of FIG. 2 showing the threads applied to the exterior surface of the cylinder body and the applied inner surface of the cylinder body.

The interior surface 14 of the cylinder body 10 is prepared by conditioning it to produce a smooth base surface upon which will be electroplated the inert metal layer 20 as shown in FIG. 2. The conditioning of the substrate surface has the effect of producing a relatively smooth exposed surface 22 on the electroplated inert metal layer 20 in the as-electroplated condition. After the conditioning, the interior steel surface 14 has a surface roughness of between 30 and 75 $R_a$ though preferably of no more than 50 $R_a$. The surface conditioning is accomplished by a multi-step, abrasive grinding procedure which utilizes a series of progressively finer abrasive grit sizes. The finer the abrasive grit size, the smoother the finish on the interior surface of the cylinder body. Greater smoothness on the interior surface results in greater smoothness on the as-electroplated inert metal layer exposed surface 22. Grit sizes between 16 and 220 mesh may be employed. For example, the interior surface 14 of the cylinder body 10 may be first ground with a 16 grit grinding wheel followed by grinding in succession with 60 grit, 120 grit, and finally 220 grit flapper wheels to produce a progressively smoother surface culminating with a surface roughness of about 50 $R_a$ or less.

Figure 3:
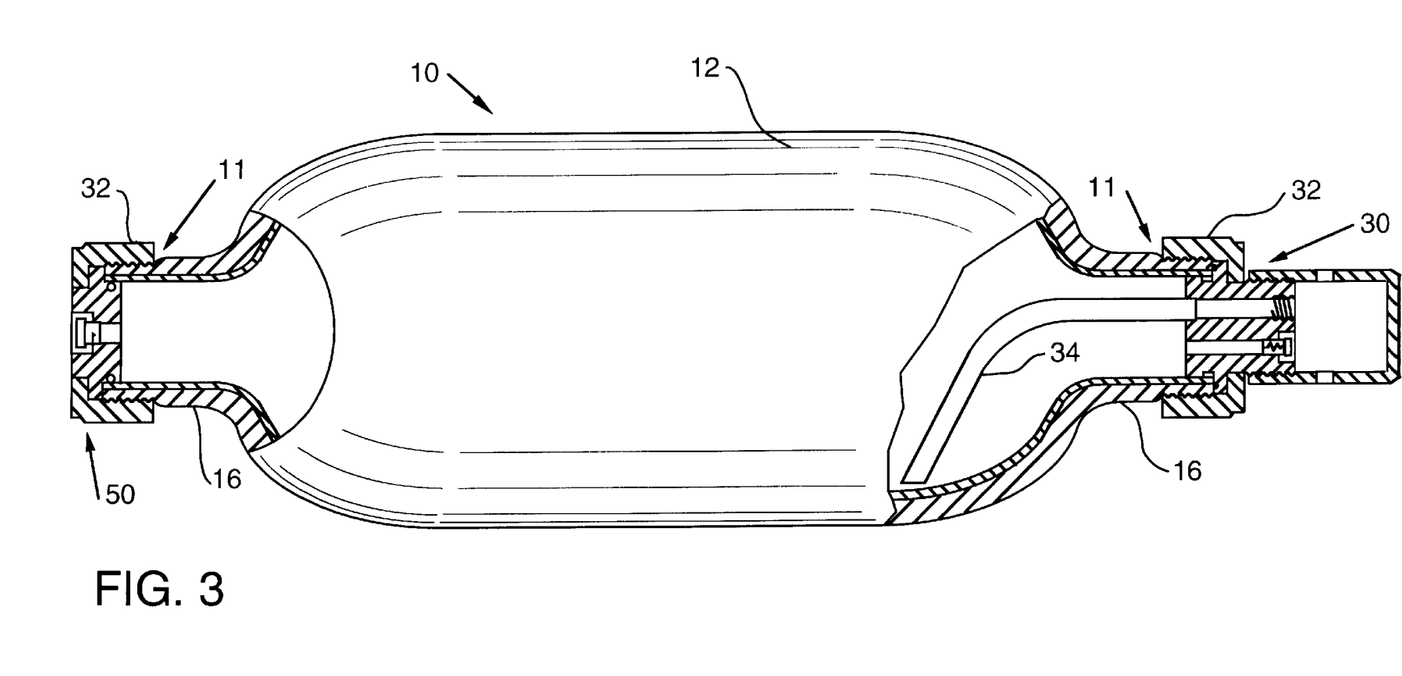
FIG. 3 is a side elevational view, partially in cross section, of the cylinder body having end closure devices affixed thereto.

If desired, the diameter of either or both of the ends 11 of the cylinder body 10 may be adjusted by thermomechanical working to the sizes necessary to accommodate the desired end-closure devices. Examples of end closure devices are shown in FIG. 3 as vented end closure device 30 and unvented end closure device 50. It is common in the gas cylinder industry to use an end-closure device that has a diameter which is much smaller than that of the main portion of the gas storage cylinder to reduce the mechanical stresses related to the end closure device. However, for economic reasons or design considerations, it may be desirable for the end-closure devices to have the alternate diameters as large as that of the main portion of the gas storage cylinder.

The sizing of the ends 11 of the cylinder body 10 may be accomplished by either thermomechanical working, machining or a combination of the two. For example, as shown in FIG. 1, a neck 16 may be formed at each end 11 of the cylinder body 10 by to thermomechanically working the ends 11. Neck 16 is preferably employed to accommodate the use of end-closure devices which are smaller in diameter than the main portion of the cylinder body 10. Hot, open-die swaging or hot spinning is employed to thermomechanically work the ends 11 of the cylinder body 10 to the desired size neck 16. In this operation, a portion of the cylinder body 10 near the end 11 to be worked is heated to around 2300° F. and swaged down to a preselected diameter. In the previously described example, this is a diameter of about 7.5 inches. Preferably, the inside diameters of the necks 16 are further adjusted by a first machining step which will minimize the amount of secondary machining that later will be required to fit the end closure devices into the ends 11 after the inert metal layer 20 has been electroplated onto the interior surface 14 of the cylinder body 10. If the optional thermomechanical processing step is not performed, a first machining step may still be employed at this point to adjust the inside diameter of the cylinder body 10 near its ends 11 to similarly minimize the amount of secondary machining that later will be required to fit the end closure devices into the ends 11 after the inert metal layer 20 has been electroplated onto the interior surface 14 of the cylinder body 10. The outside diameter of the cylinder body 10 near its ends 11 may also be adjusted by machining.

Where thermomechanical processing is used to adjust the diameters of the ends of the seamless pipe, a subsequent optional surface conditioning step is employed to remove any scale that formed on the interior surface 14 of the cylinder body 10. A variety of methods or combinations of methods known to those skilled in the art may be employed to remove the scale. For example, blasting the interior surface 14 with glass beads or other blasting media, such as steel grit, may be employed. In a preferred embodiment of the invention, a mixture of water and abrasive media is tumbled inside the rotating cylinder body 10. During tumbling, the cylinder body 10 is rotated around its longitudinal axis and the cylinder body 10 is held in an essentially horizontal position so that the abrasive media works the interior surface 14. The cylinder body 10 may optionally be inclined to polish the interior surface 22 in the vicinity of the necks 16 so that the abrasive media is longitudinally displaced during the process from one end of the cylinder body 10 to the other in a helical pattern. A mixture of abrasive media comprising silicon carbide and random-shaped alumina media together comprising approximately one-fifth the volume of the interior region 18 of the cylinder body 10 is charged into the interior region 18 along with sufficient water to cover the media. Preferably, the silicon carbide is a 150 mesh grit and the random shaped alumina is of mesh sizes 0, 1, 2, and 4. The preferred ratio of the four mesh sizes of alumina media is, by weight, 50% 0 mesh media, 20% 1 mesh media, 20% 2 mesh media, and 10% 2 mesh media. A rust inhibitor, commonly used for barrel finishing operations, having a mild alkaline base and a general-purpose abrasive, is added to prevent rusting of the interior surface 14 of the cylinder body 10 during the tumbling operation. The speed of the rotation is about 20 RPM. The tumbling is continued for approximately ten to twelve hours to achieve the desired surface condition. The water-abrasive media mixture is then discharged and the interior surface 14 is rinsed with clean water. Blasting with blasting media may be used to touch up areas of the interior surface 14 which were not sufficiently cleaned by the action of the water-abrasive media mixture. In cases where the optional thermomechanical processing step is not performed, the tumbling process described may optionally be performed after the earlier described grinding operation as a further part of the surface conditioning process.

A relatively inert metal layer 20, such as nickel, cadmium, cobalt, copper, lead, tin, silver, gold, platinum and alloys thereof, is electroplated onto the interior surface 14 of the cylinder body 10 from one end 11 to the other end 11 using methods that are known to those skilled in to the art of electroplating. The inert metal layer is so adapted to cover substantially the entire interior surface of the cylinder body. The metal selected to form the inert metal layer 20 is one that is less reactive with the gas that is to be stored than is the steel used for the cylinder body 10. The inert metal layer 20 may further comprise more than one ply where each ply is either of the same or of a different composition. In the preferred embodiment, the inert metal layer 20 consists of a single ply of nickel.

The Watts bath method of electroplating is preferably employed using a nickel anode and the cylinder body 10 as the cathode to plate an inert metal layer 20 of nickel of 0.032 inches minimum thickness onto the interior surface 14 of the cylinder body 10. The inert metal layer 20 has an exposed surface 22 which in service will be exposed to the gas stored in the interior region 18 of the cylinder body 10. Where the ends 11 of the cylinder body 10 have been adjusted to a size differing from that of the main portion of the cylinder body 10, those who are skilled in the art of electroplating will recognize the process adjustments necessary to accomplish the electroplating of surfaces which are of various distances from the centerline of the cylinder body 10.

The cylinder body is heat treated after electroplating to remove any hydrogen that may have diffused into the steel during the electroplating and to strengthen and toughen the steel to the levels required by the applicable regulations, such as the United States Department of Transportation regulations set forth in Title 49 of the Code of Federal Regulations §§ 178.36 and 178.37 (1995 edition). Removal of the diffused hydrogen is important as hydrogen may embrittle the steel of the cylinder body 10 leading to catastrophic failure of the gas storage cylinder during service. As one skilled in the art will recognize, the parameters of the heat treatment depend on the grade of steel chosen for the cylinder body 10. For example, where the steel is grade 4130X, the heat treatment consists of a 1675° F. austenitizing step, a quench step, and a tempering step at 1000° F. minimum. Note that the resistance to scaling of the nickel plating makes it unnecessary to use a protective atmosphere during the heat treatment.

It is also possible to perform the heat treatment step to strengthen and toughen the steel to specification prior to the electroplating step. If such a step is performed, however, it will be necessary to conduct an additional, secondary heat treatment to bake-out the hydrogen picked up during electroplating. The conditions of the bake-out heat treatment may depend on the grade of the steel. For example, for grade 4130X such a bake-out heat treatment is preferably accomplished by holding the cylinder body in a furnace at 385° F. for four hours.

Exterior surface 12 of the cylinder body may also be conditioned to remove scale and other surface defects. Inspection of the exterior surface for structural defects may also be performed at this time. Surface conditioning may be done by grit blasting with steel grit followed by an inspection of the exterior surface for structural defects.

An important feature of the invention is the use of end-closure devices which do not employ threads machined into the interior of the cylinder body 10. The usual practice of threading the interior of the neck region of a standard gas storage cylinder poses the threat of trapping particulate contaminants in the threads which later may become dislodged and contaminate both the gas and the resultant products manufactured with the gas, such as computer chips. The use of internal threads also make it nearly impossible to extend the protective nickel coating to the ends of the cylinder body and to completely eliminate the exposure of the gas to steel. Such contamination is substantially reduced by the use of threads 26 fashioned, for example by machining, into the outer surface 12 of the cylinder body 10 as shown in FIGS. 2 and 2A. As illustrated in FIG. 3, vented end closure device 30 and unvented end closure device 50 are secured by closure nuts 32 having internal threads 33 which engage external threads 26 on the exterior surface 12 of the cylinder body at the necks 16. The fashioning of the threads 26 in the external surface of the cylinder body may be performed at any stage or performed in steps so long as the threads are serviceable when the gas storage cylinder is complete and care is taken to prevent contamination of the exposed surface 22 of the inert metal layer 20.

The internal surface 14 of the cylinder body 10 near the ends 11 is machined to the final dimensions required to accommodate the end closures. For example, the diameters may be machined to a tolerance of +0.002 inches/−0.000 inches. Hydrotesting of the cylinder body required by applicable regulations is also performed at this point. The exposed surface 22 of the inert metal layer 20 is then cleaned to remove any residue resulting from the machining operation. Steam cleaning is typically employed to accomplish this step.

A final surface conditioning treatment is performed on the exposed surface 22 of the inert metal layer 20 to work that surface, which is intended to substantially eliminate or heal over grooves, pores, rough areas, and other irregularities. The final surface conditioning treatment reduces the surface roughness of the exposed surface 22 of the inert metal layer 20 to between 3 and 30 $R_a$ though preferably to about 15 $_aR$ or better. The preferred conditioning step is accomplished by using a three-stage procedure in which different water-abrasive media mixtures are tumbled in the substantially horizontally-positioned, rotating cylinder body 10. During tumbling, the cylinder body 10 is rotated around its longitudinal axis and is held in an essentially horizontal position. Alternatively, the cylinder body 10 may be inclined from the horizontal so that the abrasive media works the exposed surface 22 in the vicinity of the necks 16. In the first step of the example embodiment, the surface roughness of the exposed surface 22 is brought to approximately 30 $R_a$ by using a mixture of mesh size 0, 1, 2, and 4 random-shaped ceramic media containing alumina or silica together comprising approximately one-fifth the volume of the interior region 18 of the cylinder body 10. The preferred ratio of the three mesh sizes of alumina media is, by weight, 50% 0 mesh media, 20% 1 mesh media, 20% 2 mesh, and 10% 4 mesh media. This mixture is charged into the interior region 18 along with water. Preferably, only as much water is added as is needed to allow the media to slide on the exposed surface 22 during this tumbling step. The cylinder body 10 is rotated about its longitudinal axis at about 20 RPM for approximately forty hours to achieve the desired surface roughness of about 30 $R_a$. The operation is periodically interrupted to flush some of the contaminants out of the media. The mixture is then discharged from interior region 18. If desired, the exposed surface 22 of the inert metal layer 20 in the regions near the ends 11 may be further polished using a 180 grit flapper wheel.

The second stage of the preferred final surface conditioning treatment preferably utilizes an extruded alumina media about 1 inch long cut at about 22 degrees from the extrusion direction and having an elliptical cross-section with a minor diameter of about 7/16 inch and a major diameter of about 1 inch. A quantity of media equal to about one-fifth the volume of the interior region 18 is charged into the interior region 18 of the cylinder body 10 with sufficient water to cover the media. The media is tumbled for about twelve hours at a cylinder body 10 rotation speed of about 20 RPM. The water is then flushed out and replaced with water containing a burnishing compound such as borax. The media are tumbled for several more hours until the surface roughness of the exposed surface 22 of the inert metal layer 20 is about or less than 15 $R_a$. The mixture is then discharged and the exposed surface 22 is rinsed with clean water.

The third stage of the preferred final surface conditioning treatment employs a stainless steel media of a type commonly employed in barrel finishing operations. The third stage is optional and is employed when a high luster finish on the exposed surface 22 is desired. The stainless steel media is preferably selected from ball-cones, pins, or a combination of the two. A quantity of media equal to about one-half the volume of the interior region 18 is charged into the interior region 18 of the cylinder body 10 along with a mildly acidic burnishing compound solution such as is commonly used in barrel finishing operations. The media is tumbled for about twelve hours at a vessel body 10 rotation speed of about 20 RPM while fresh burnishing compound solution is flowed through media at the rate of about a gallon per minute. At the conclusion of the tumbling, the mixture is discharged and the exposed surface 22 of the inert metal layer is rinsed clean using distilled water.

Figure 4:
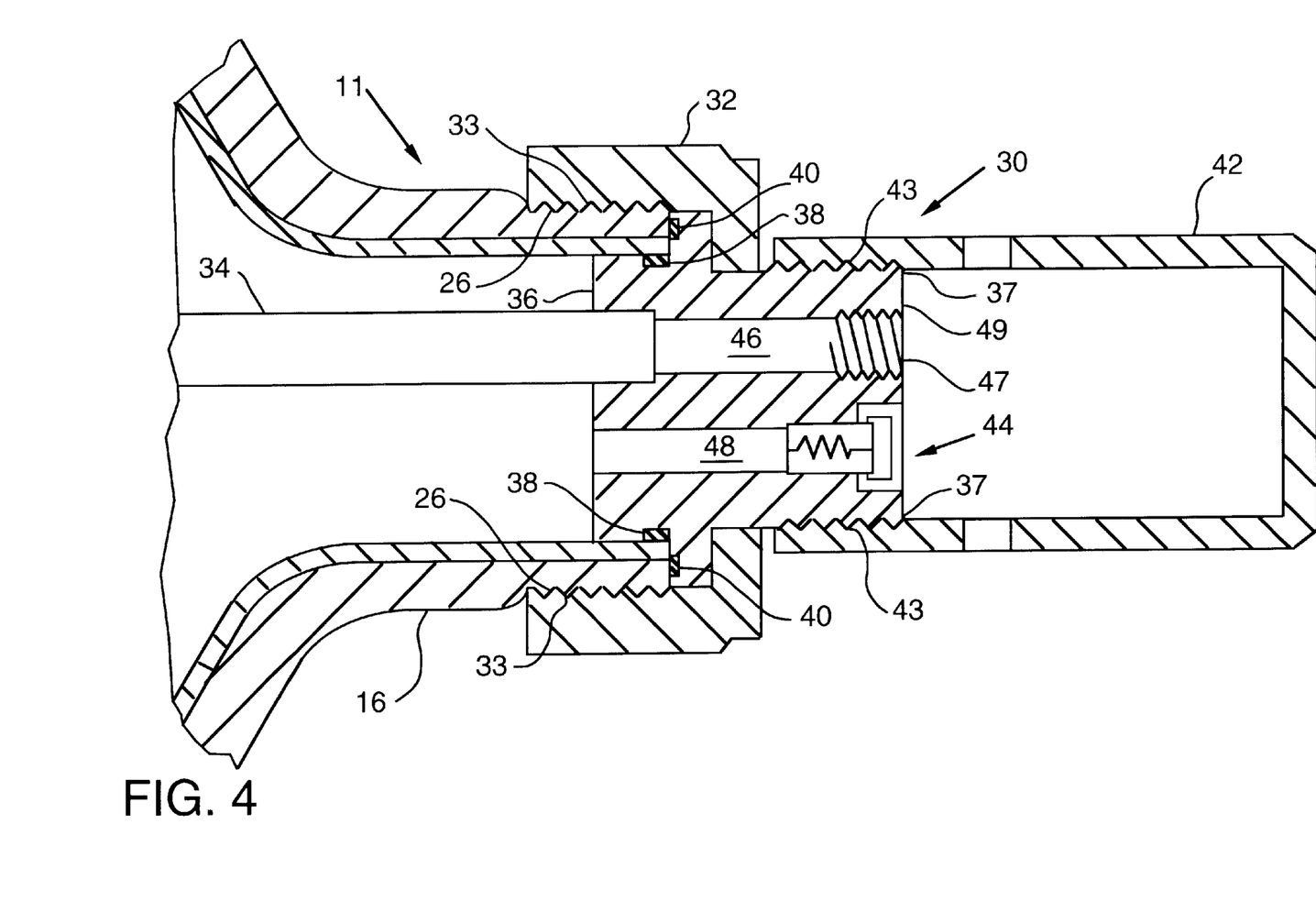
FIG. 4 is a side elevational view, partially in cross section, illustrating the details of the sealing and attachment means of the end closure device.
Figure 5:
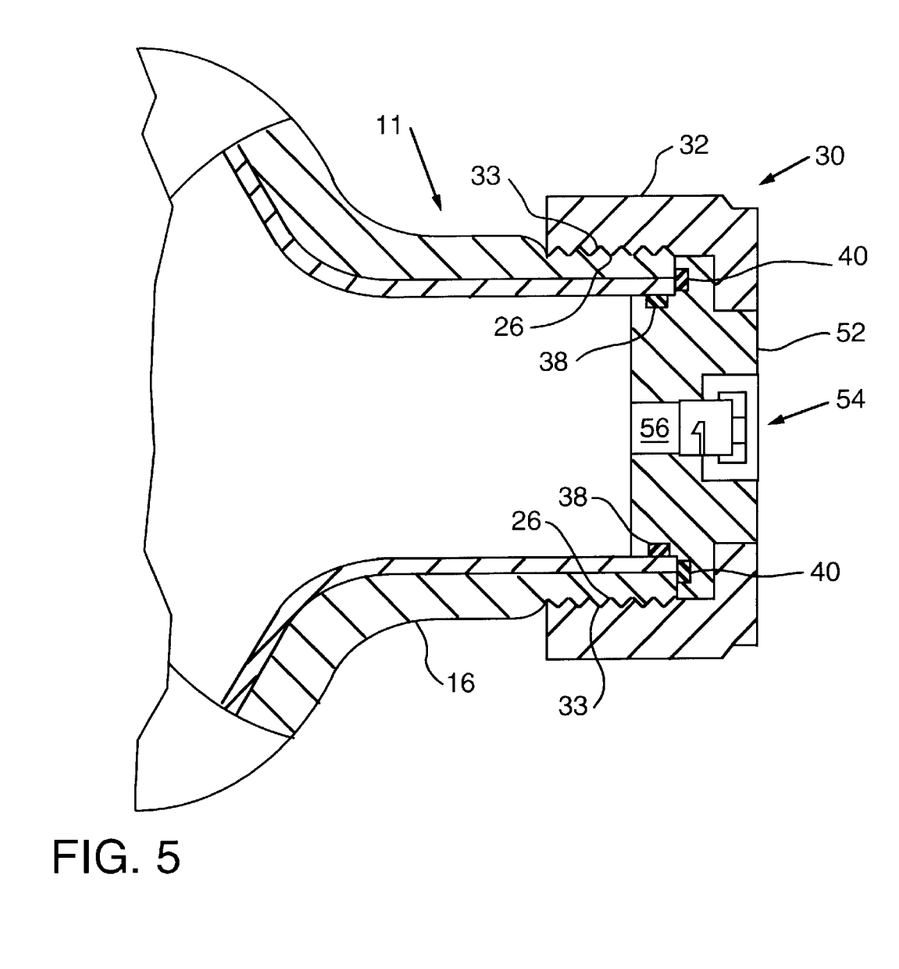
FIG. 5 is a side elevational view, partially in cross section, illustrating the details of a second embodiment of the sealing and attachment means of the end closure device.

Referring now to FIGS. 3, 4, and 5, the vented end closure device 30 and unvented end closure device 50 are then inserted into the ends 11 of the cylinder body 10 and secured to the cylinder body 10. Vented end closure device 30 incorporates closure body 36 and unvented end closure device 50 incorporates closure body 52. Closure body 36 and closure body 52 are made of a high strength metal such as Hastelloy C22, manufactured by Haynes International, Kokomo, Ind. At least one of vented end closure device 30 and unvented end closure device 50 has a gas transfer means such as a gas passageway 46 through which gas can be charged into and discharged from the interior region 18 of the cylinder body 10. In FIG. 3, such a gas passageway 46 is shown in body 36 of end closure device 30. The outer end portion 47 of the gas passageway 46 must be furnished with threads 49 or some other means to attach a valve for controlling the flow of gas or a plug when the gas storage cylinder is not in service. Optionally, a conducting tube 34 for conducting gaseous or liquefied gas may also be attached to and be in fluid communication with gas passageway 46. A safety cap 42 having threads 43 may also be attached to end closure body 36 by engaging threads 43 with threads 37 machined into body 36. Either or both vented end closure device 30 and unvented end closure device 50 may optionally also have a safety relief valve device, 44 and 54, situated in a safety relief valve gas passageway, 48 and 56, as illustrated in FIGS. 4 and 5.

Vented end closure device 30 and unvented end closure device 50 both contain a sealing device 38 and 40 which must make a gas-tight seal with the exposed surface 22 or the end face 28. An end face 28 is shown in FIG. 2A. The seal must permit the storage of gas in the interior region 18 of the cylinder body 10 at service pressures. As illustrated in FIGS. 4 and 5, vented end closure device 30 and unvented end closure device 50 both employ a radial seal gland 38 which seals against the exposed surface 22 of the inert metal layer 20. Vented end closure device 30 and unvented end closure device 50, also each further comprise a face seal gland 40 as a redundant sealing mechanism. The face seal gland 40 seals against the end face 28.

Vented end closure device 30 and unvented end closure device 50, are secured to the cylinder body 10 by a securing device such as a closure nut 32 as shown in FIGS. 3–5. Closure nut 32 has threads 33 as shown in FIGS. 4 and 5. Threads 33 on the closure nut 32 engage threads 26 on the outer surface 12 of the cylinder body 10 to secure the closure nut 32 and an end closure device, for example vented end closure device 30 and unvented end closure device 50, to the cylinder body 10. Locking screws may be incorporated to the closure nut 32 to further secure the closure nut 32 in place.

After vented end closure device 30 and unvented end closure device 50 are in place, any moisture remaining inside the cylinder may be removed by conventional means such as purging with hot, dry gas, vacuum outgassing, baking at 425° F. or using a combination of these methods. Painting of the exterior surface of the cylinder body may be accomplished at this point.

While a present preferred embodiment of the invention has been described, it is to be distinctly understood that the invention is not limited thereto but may be otherwise embodied and practiced within the scope of the following claims.

What is claimed is:

1. A seamless steel-body gas storage cylinder comprising:
   (a) a seamless steel cylinder body having an exterior surface, an interior surface, an interior region, first and second ends, and at least one end face, said exterior surface having threads proximate to said first and second ends;
   (b) an inert metal layer entirely covering said interior surface, said inert metal layer having an exposed surface;
   (c) at least one end closure device having a gas transfer means;
   (d) at least one securing device threadably engaging the exterior surface of the cylinder body, said securing device receiving and restraining at least one said end closure device to said cylinder body.

2. A seamless steel-body gas storage cylinder as described in claim 1, in which said exposed surface of said inert metal layer has a surface roughness of between 3 and 30 $R_a$.

3. A seamless steel-body gas storage cylinder described as in claim 2, in which said exposed surface of said inert metal layer has a surface roughness of no more than about 15 $R_a$.

4. A seamless steel-body gas storage cylinder as described in claim 1, in which said inert metal layer has at least one ply.

5. A seamless steel-body gas storage cylinder as described in claim 1, in which said inert metal layer contains a metal selected from the group of nickel, cadmium, cobalt, copper, lead, tin, silver, gold, platinum, and alloys thereof.

6. A seamless steel-body gas storage cylinder as described in claim 1, wherein said inert metal layer has a thickness of between about 0.010 and about 0.045 inches.

7. A seamless steel-body gas storage cylinder as described in claim 6, wherein said inert metal layer has a minimum thickness of about 0.032 inches.

8. A seamless steel-body gas storage cylinder as described in claim 6, wherein said inert metal layer has a minimum thickness of about 0.010 inches.

9. A seamless steel-body gas storage cylinder as described in claim 1, wherein said at least one end closure device further comprises a radial seal gland forming a gas-tight seal between said closure body and said exposed surface of said inert metal layer.

10. A seamless steel-body gas storage cylinder as described in claim 1, wherein said at least one end closure device further comprises a face seal gland forming a gas-tight seal between the closure body of said end closure device and said end face of the cylinder body.

11. A seamless steel-body gas storage cylinder as described in claim 9, wherein said at least one end closure device further comprises a face seal gland forming a gas-tight seal between the closure body of said end closure device and said end face of the cylinder body.

12. A seamless steel-body gas storage cylinder as described in claim 1, wherein the cylinder body is made from steel grade 4130X.

13. A seamless steel-body gas storage cylinder as described in claim 1, wherein said closure body is made of Hastelloy C22.

14. A seamless steel-body gas storage cylinder comprising a seamless steel cylinder body having an exterior surface, an interior surface, an interior region, first and second ends, and at least one end face, said exterior surface having threads proximate to said first and second ends, an inert metal layer entirely covering said interior surface, said inert metal layer having an exposed surface, at least one end closure device having a gas transfer means, at least one securing device threadably engaging the exterior surface of the cylinder body, said securing device receiving and restraining at least one said end closure device to said cylinder body, said seamless steel-body storage cylinder constructed by the process of:

(a) cutting a seamless steel pipe to form a cylinder body having an exterior surface, an interior surface, an interior region, first and second ends, and at least one end face;

(b) electroplating onto said interior surface an inert metal layer, the inert metal layer having an exposed surface;

(c) fashioning threads into the exterior surface of the cylinder body proximate to said first and second ends;

(d) machining the exposed surface of the inert metal layer;

(e) sealing at least one said first and second ends with an end closure device; and (f) securing at least one said end closure device with a securing device threadably engaged with said threads machined into said exterior surface.

15. A seamless steel-body gas storage cylinder constructed by the process as described in claim 14, further comprising a step of preparing said interior surface to reduce the roughness of said interior surface.

16. A seamless steel-body gas storage cylinder constructed by the process as described in claim 15, wherein said interior surface is prepared to a surface roughness of between 30 and 75 $R_a$.

17. A seamless steel-body gas storage cylinder constructed by the process as described in claim 16, wherein said interior surface is prepared to a surface roughness of no more than about 50 $R_a$.

18. A seamless steel-body gas storage cylinder constructed by the process as described in claim 14, further comprising the step of sizing the cylinder body to alter the diameter of the cylinder body proximate to at least one of said first and second ends.

19. A seamless steel-body gas storage cylinder constructed by the process as described in claim 18, wherein said sizing step further comprises machining the cylinder body.

20. A seamless steel-body gas storage cylinder constructed by the process as described in claim 18, wherein said sizing step includes thermomechanically working the cylinder body.

21. A seamless steel-body gas storage cylinder constructed by the process as described in claim 20, wherein said thermomechanically working the cylinder body is accomplished by hot swaging.

22. A seamless steel-body gas storage cylinder constructed by the process as described in claim 20, wherein said thermomechanically working the cylinder body is accomplished by hot spinning.

23. A seamless steel-body gas storage cylinder constructed by the process as described in claim 20, further comprising a step of descaling said interior surface.

24. A seamless steel-body gas storage cylinder constructed by the process as described in claim 15, wherein said preparing step further comprises blasting at least a portion of the interior surface of the cylinder body with blasting media.

25. A seamless steel-body gas storage cylinder constructed by the process as described in claim 24, wherein said blasting media further comprises at least one from selected from a group consisting of glass beads and steel grit.

26. A seamless steel-body gas storage cylinder constructed by the process as described in claim 15, wherein said preparing step further comprises tumbling with a mixture which includes abrasive media and water.

27. A seamless steel-body gas storage cylinder constructed by the process 26, wherein said abrasive media includes at least one selected from the group of silicon carbide media, alumina media, and 150 mesh silicon grit.

28. A seamless steel-body gas storage cylinder constructed by the process as described in claim 27, wherein said alumina media includes a mixture of random shaped alumina media of mesh sizes 0, 1, 2, and 4.

29. A seamless steel-body gas storage cylinder constructed by the process as described in claim 26, wherein a rust inhibitor is added to the mixture of water and abrasive media.

30. A seamless steel-body gas storage cylinder constructed by the process as described in claim 14, further comprising a step of heat treating said cylinder body.

31. A seamless steel-body gas storage cylinder constructed by the process as described in claim 30, wherein said heat treating step includes an austenitizing step, a quenching step, and a tempering step.

32. A seamless steel-body gas storage cylinder constructed by the process as described in claim 31, wherein the austenitizing step is performed at about 1675° F.

33. A seamless steel-body gas storage cylinder constructed by the process as described in claim 31, wherein the tempering step is performed at about 1000° F.

34. A seamless steel-body gas storage cylinder constructed by the process as described in claim 30, further comprising an additional heat treating step performed prior to said electroplating step.

35. A seamless steel-body gas storage cylinder constructed by the process as described in claim 34, wherein said additional heat treating step is performed to strengthen and toughen said cylinder body.

36. A seamless steel-body gas storage cylinder constructed by the process as described in claim 34, wherein said heat treatment done after said electroplating step is at about 385° F. for about four hours.

37. A seamless steel-body gas storage cylinder constructed by the process as described in claim 14, wherein the inert metal layer contains a metal selected from the group consisting of cadmium, cobalt, copper, lead, tin, silver, gold, platinum, and alloys thereof.

38. A seamless steel-body gas storage cylinder constructed by the process as described in claim 14, wherein said inert metal layer contains nickel.

39. A seamless steel-body gas storage cylinder constructed by the process as described in claim 14, wherein said inert metal layer is electroplated in at least one ply.

40. A seamless steel-body gas storage cylinder constructed by the process as described in claim 38, wherein said inert metal layer is electroplated to a minimum thickness of about 0.032 inches.

41. A seamless steel-body gas storage cylinder constructed by the process as described in claim 38, wherein said inert metal layer is electroplated to a minimum thickness of about 0.010 inches.

42. A seamless steel-body gas storage cylinder constructed by the process as described in claim 14, further comprising a conditioning step to reduce the surface roughness of said exposed surface of said inert metal layer.

43. A seamless steel-body gas storage cylinder constructed by the process as described in claim 42, wherein said exposed surface of said inert metal layer is conditioned to a surface roughness of between about 3 and about 30 $R_a$.

44. A seamless steel-body gas storage cylinder constructed by the process as described in claim 43, wherein said exposed surface of said inert metal layer is conditioned to a surface roughness of no more than about 15 $R_a$.

45. A seamless steel-body gas storage cylinder constructed by the process as described in claim 42, wherein said conditioning of said exposed surface of said inert metal layer includes a process of tumbling with a mixture which includes abrasive media and water.

46. A seamless steel-body gas storage cylinder constructed by the process as described in claim 45, wherein said abrasive media includes at least one selected from the group of silicon carbide media and alumina media.

47. A seamless steel-body gas storage cylinder constructed by the process as described in claim 46, wherein said alumina media includes a mixture of random shaped alumina media of mesh sizes 0, 1, 2 and 4.

48. A seamless steel-body gas storage cylinder constructed by the process as described in claim 40, wherein said conditioning of said exposed surface of said inert metal layer includes a process of tumbling with stainless steel media.

49. A seamless steel-body gas storage cylinder constructed by the process as described in claim 14, wherein said step of machining said exposed surface of said inert metal layer is performed on said exposed surface proximate to at least one of said first and second ends.

50. A seamless steel-body gas storage cylinder constructed by the process as described in claim 49, wherein said step of machining said exposed surface of said inert metal layer is performed to permit at least one of said first and second ends to form a gas-tight seal in conjunction with said end closure device.

51. A seamless steel-body gas storage cylinder constructed by the process as described in claim 14, wherein at least one of said at least one end closure further comprises a gas transfer means.

52. A seamless steel-body gas storage cylinder constructed by the process as described in claim 14, wherein said sealing step is performed by sealing said first end with a first end closure device and sealing said second end with a second end closure device.

53. A seamless steel-body gas storage cylinder constructed by the process as described in claim 14, wherein at least one said end closure device is removably secured.

* * * * *

UNITED STATES PATENT AND TRADEMARK OFFICE
CERTIFICATE OF CORRECTION

PATENT NO. : 6,089,399
DATED : July 18, 2000
INVENTOR(S) : Felbaum et al.

It is certified that error appears in the above-identified patent and that said Letters Patent is hereby corrected as shown below:

Column 1,
Line 60, "imitations" should read -- limitations --.

Column 5,
Line 36, delete "to".

Column 6,
Line 21, "10% 2 mesh media" should be -- 10% 4 mesh media --.

Column 8,
Line 5, "15 $_aR$" should read -- 15 $R_a$ --.
Line 21, delete "three" and insert -- four --.

Claim 25,
Line 59, delete "from".

Claim 27,
Line 67, after "process" insert -- as described in claim --.

Claim 48,
Line 13, "claim 40" should be -- claim 42 --.

Signed and Sealed this

Twentieth Day of November, 2001

Attest:

NICHOLAS P. GODICI
*Attesting Officer*     *Acting Director of the United States Patent and Trademark Office*